United States Patent [19]
Emura

[11] Patent Number: 5,768,038
[45] Date of Patent: Jun. 16, 1998

[54] LENS DEVICE

[75] Inventor: Tetsuji Emura, Hachioji, Japan

[73] Assignee: Konica Corporation, Tokyo, Japan

[21] Appl. No.: 786,832

[22] Filed: Jan. 21, 1997

[30] Foreign Application Priority Data

Jan. 26, 1996 [JP] Japan ............... 8-011894
Jul. 22, 1996 [JP] Japan ............... 8-192137

[51] Int. Cl.⁶ ...................................... G02B 7/02
[52] U.S. Cl. .................. 359/824; 359/823; 359/814
[58] Field of Search ..................... 359/814, 822, 359/823, 824, 826

[56] References Cited

U.S. PATENT DOCUMENTS

| | | | |
|---|---|---|---|
| 5,225,941 | 7/1993 | Saito et al. | 359/824 |
| 5,576,894 | 11/1996 | Kuwana et al. | 359/823 |
| 5,587,846 | 12/1996 | Miyano et al. | 359/823 |
| 5,633,763 | 5/1997 | Suzuki et al. | 359/822 |
| 5,644,440 | 7/1997 | Akada | 359/823 |

FOREIGN PATENT DOCUMENTS

| | | |
|---|---|---|
| 13216 | 1/1990 | Japan. |
| 177206 | 6/1992 | Japan. |
| 262309 | 10/1996 | Japan. |

*Primary Examiner*—Loha Ben
*Attorney, Agent, or Firm*—Finnegan, Henderson, Farabow, Garrett & Dunner, L.L.P.

[57] ABSTRACT

A device for moving a lens includes a lens frame; a guiding member for guiding the lens frame; a signal generator for generating an electric signal; a piezoelectric vibrator for moving the lens frame along the guiding member by vibration according to the electric signal; a supporter for supporting the piezoelectric vibrator; a pressure surface to be in pressure contact with the piezoelectric vibrator; and pressure member for bringing the piezoelectric vibrator into pressure contact with the pressure surface.

3 Claims, 14 Drawing Sheets

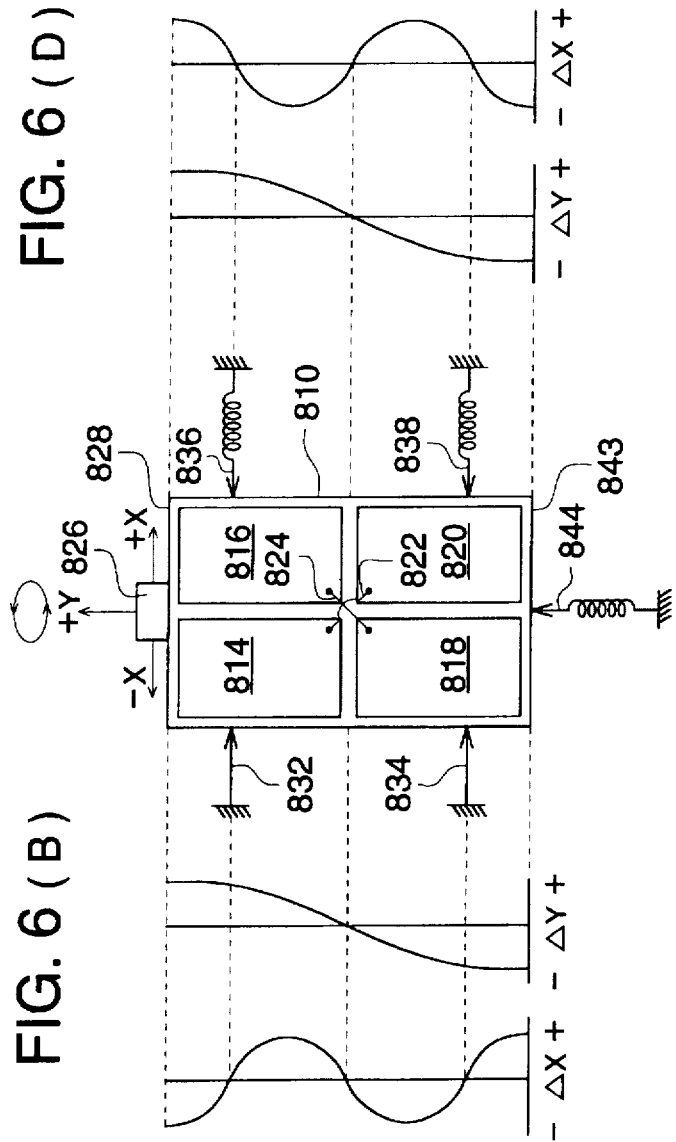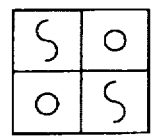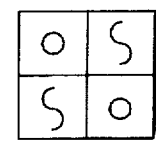

LENS DEVICE

BACKGROUND OF THE INVENTION

The present invention relates to a lens device which is used for cameras, video cameras, or similar devices.

A conventional example of a lens device used in video cameras is shown in FIG. 13.

This lens device is structured by an optical system composed of 4 lens groups of L1 through L4, in which one fixed lens group L1 is fixed in a front lens barrel, and another fixed lens group L3 is fixed in a rear lens barrel.

A moving frame 21 to hold a movable lens group for magnification L2, which is a lens group for magnification change, is supported by 2 guide poles 14 and 15 so that the moving frame 21 can move to be slidable along the optical axis. A cam pin 24, studded on the moving frame 21, is engaged with a cam groove 12 of a cylindrical cam 11, and when a cylindrical cam 11 is rotated around the optical axis 0 through gears 52 and 13, activated by a motor 51, the moving frame 21 is moved along the cam groove 12 in the direction of the optical axis.

A moving frame 41 which holds a moving lens group L4, which is a focusing lens group, is supported by a guide pole 31, a straight advancing guide 34, and an engagement pin 43, so that the moving frame 41 can be moved to be slidable along the optical axis. An engagement portion 44, provided on the moving frame 41, is engaged with a nut 73, screwed on a lead screw 72 which is integrally formed with an output shaft of a stepping motor 71, so that the nut 73 can not rotate. Therefore, the moving frame 41 is moved along the optical axis by the rotation of the lead screw 72, powered by the stepping motor 71.

Further, the degree of rotation of the cylindrical cam 11 is inputted into an encoder 61 through gears 13, 62 and 63, and the position of the moving frame 21, which provides magnification change information, can be obtained from the encoder 61.

The initial point of the position information of the moving frame 41, which is the focusing lens group, is predetermined at the time of starting of the camera by a photo-interrupter 81, and thereby, when pulses applied into the stepping motor 71 are counted, the current position information can be obtained.

Incidentally, the photo-interrupter 81 is widely known as used in a lens device, which has been disclosed in Japanese Utility Model Open to Public Inspection No. 13216/1990, or similar documents.

In the conventional example above, not only a large number of parts and many assembly operations have been required, but also, production cost has been greatly increased because, specifically, a cylindrical cam has been used, which is a metallic cutting processed part, having disadvantages in mass productivity.

After that, the moving frame 21 which holds the movable lens group for magnification L2, which is a lens group for magnification change, has also been improved to a lead screw type drive utilizing a stepping motor, similar to the focusing lens group as disclosed in Japanese Patent Publication Open to Public Inspection No. 177206/1992. However, this stepping motor generates not only much noise and requires large power consumption, but also, because the size of the lead screw drive motor is large, the shape of the appearance of the lens device is largely determined by this lens drive device, that is, the actuator, so that it does not meet the shape of the appearance of the lens device required by the camera, and further, the overall size of the lens device is increased, which counters the recent tendency of size reduction of cameras, which is a major problem.

This results in an actuator which is relatively large with respect to the optical system to be used. Thereby, there is practically no space to mount an actuator in an optical system having more than two types of moving frames, resulting in a narrow selection of an optical system to be used.

SUMMARY OF THE INVENTION

An object of the present invention is to solve such problems, and to provide a lens device to move a moving lens using an actuator, in which the number of parts is smaller, a required space is very small, the degree of freedom for mounting is larger, power consumption is reduced, and no noise is generated.

The above problems are solved by a lens device having at least one moving lens frame which is supported to be slidable along the optical axis, wherein for each moving lens frame, one piezoelectric vibrator is provided on either the moving lens frame or a fixed portion of the lens device, and the piezoelectric vibrator comes into pressure-contact with a portion of either the moving lens frame or the fixed portion, on which the piezoelectric vibrator is not provided, to be excited by electric signals.

An example of a structure of the lens device is as follows. The lens device comprises: a lens frame (11); a guiding means (12) for guiding the lens frame; a signal generating means for generating an electric signal; a piezoelectric vibrator (14) for moving the lens frame along the guiding means by vibrations according to the electric signal; a supporting means (15) for supporting the piezoelectric vibrator; a pressure surface (16) to be in pressure contact with the piezoelectric vibrator; and a pressure means (17) for bringing the piezoelectric vibrator into pressure contact with the pressure surface.

As for the above example of the structure, at least four conceptual views can be considered as shown in FIGS. 1(A) through 1(D). Numerical 18 in the drawings shows a fixed portion of the main body of the lens device, and the arrow in the drawings shows the direction in which the pressure means brings the piezoelectric vibrator into pressure contact with the pressure surface.

In this connection, as the above piezoelectric vibrator, any of the following piezoelectric crystals, which show the piezoelectric effect, may be used; lead glass crystal, Rochelle salt, barium titanate, ferroelectric crystal, some type of non-ferroelectric crystal, some type of ceramics, etc.

BRIEF DESCRIPTION OF THE DRAWINGS

FIGS. 6(A) through 6(F) are illustrations to explain vibrations of a piezoelectric vibrator.

DETAILED DESCRIPTION OF THE PREFERRED EMBODIMENT

Figure 1:
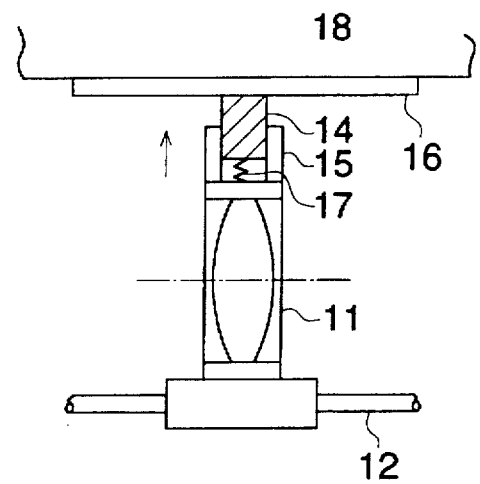
FIGS. 1(A) through 1(D) are conceptual views of a lens device.
Figure 1:
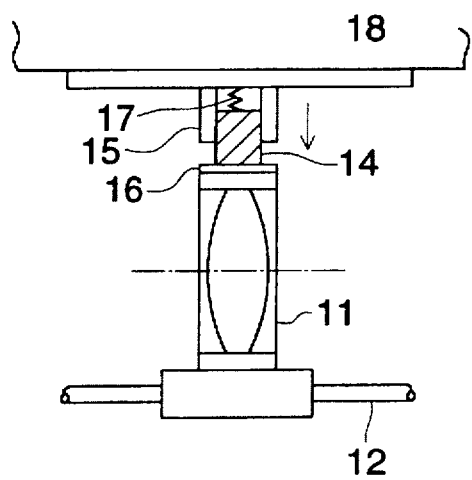
Figure 1:
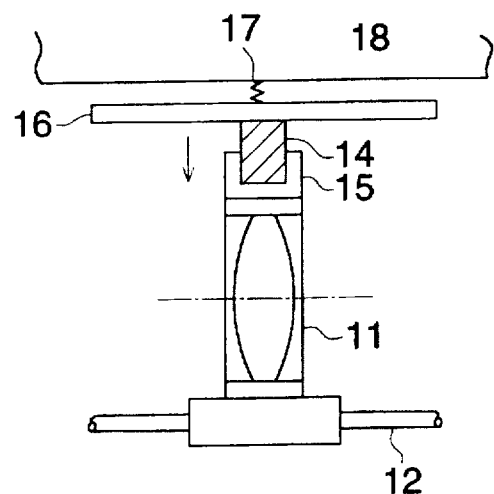
Figure 1:
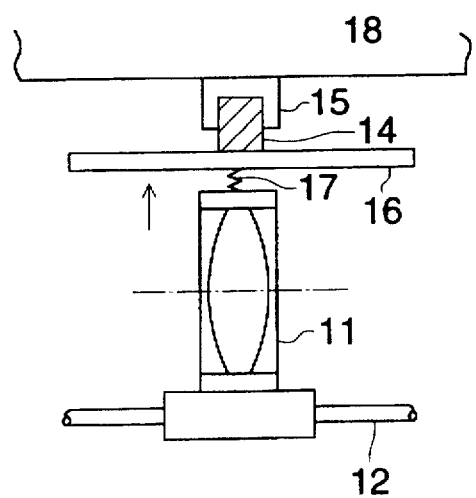
Figure 2:
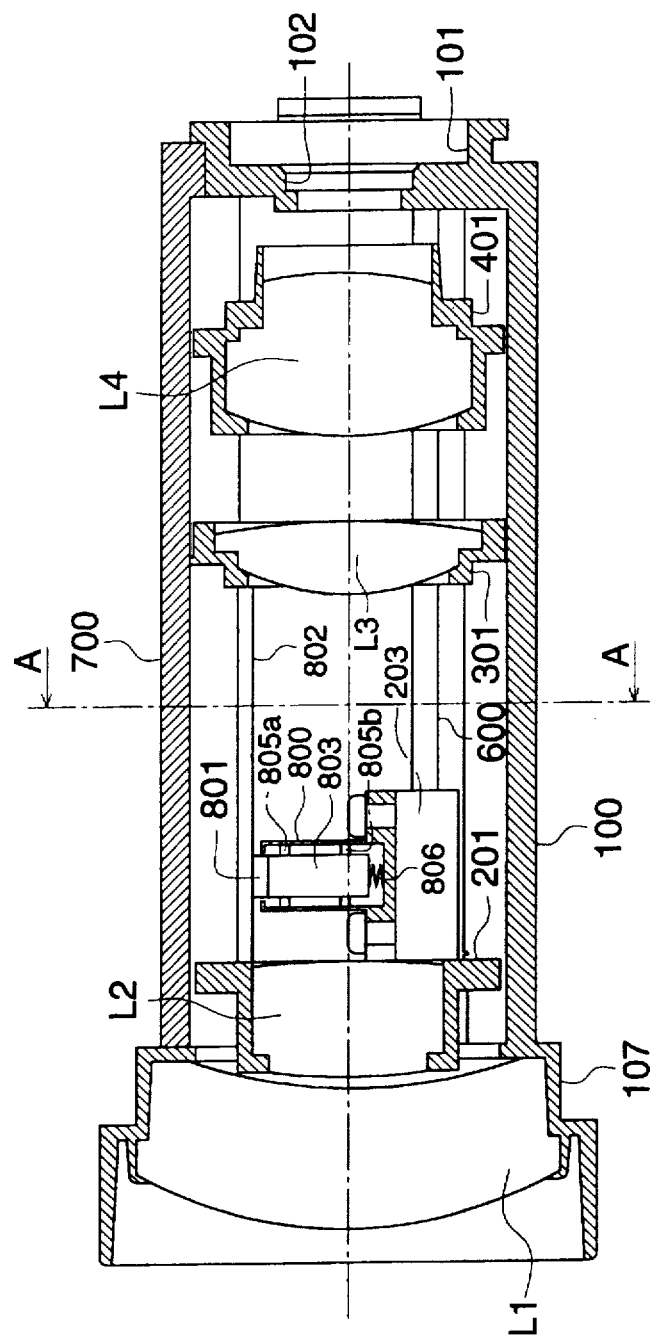
FIG. 2 is a vertical sectional view of a lens device.
Figure 3:
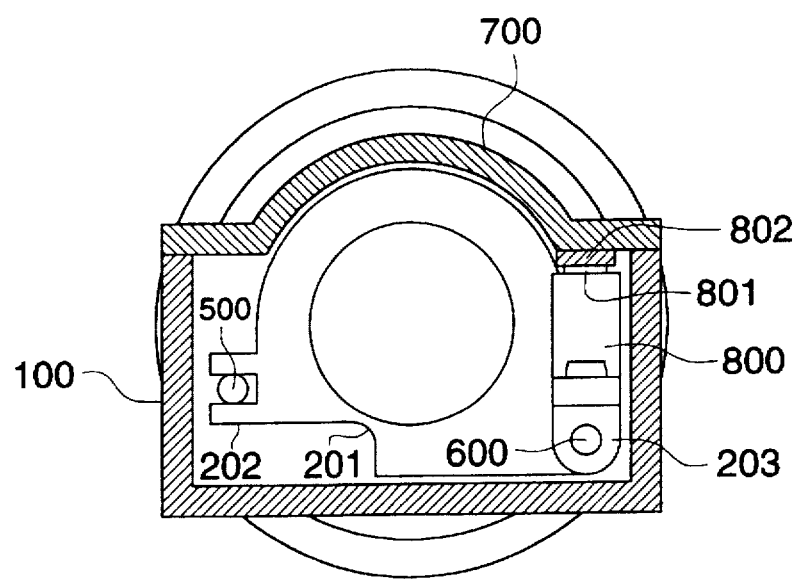
FIG. 3 is a sectional view, taken on line A—A of the lens device in FIG. 2.
Figure 4:
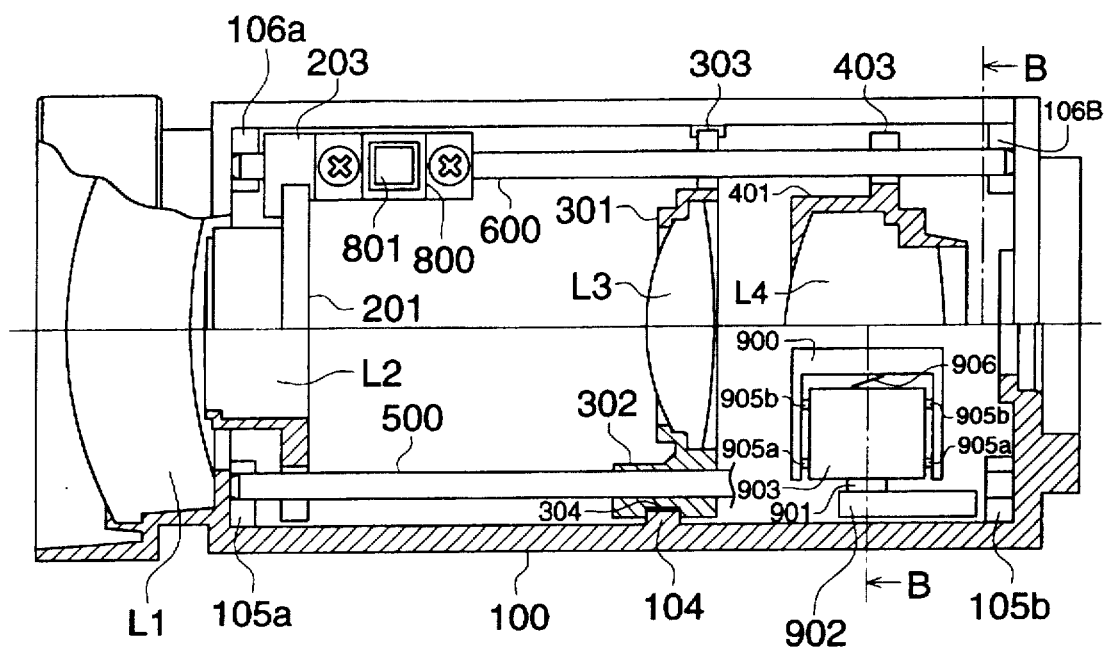
FIG. 4 is a plan view of the lens device.
Figure 5:
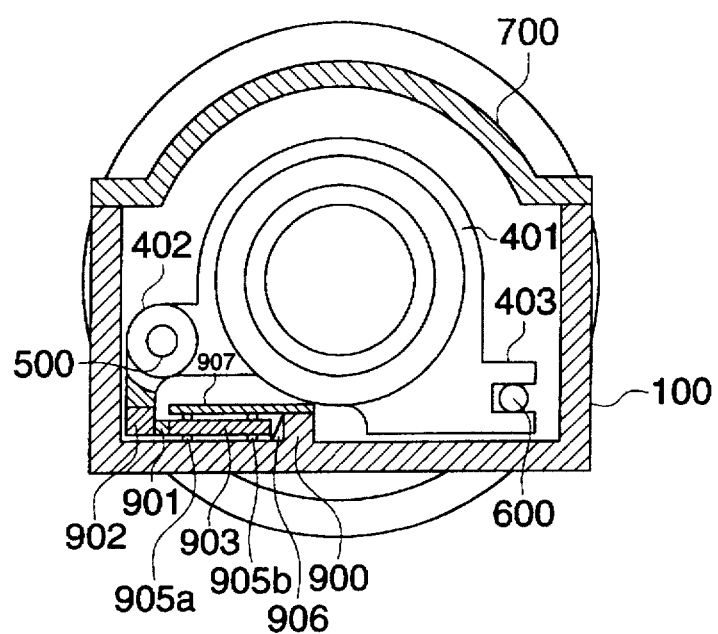
FIG. 5 is a sectional view, taken on line B—B of the lens device in FIG. 4.
Figure 7:
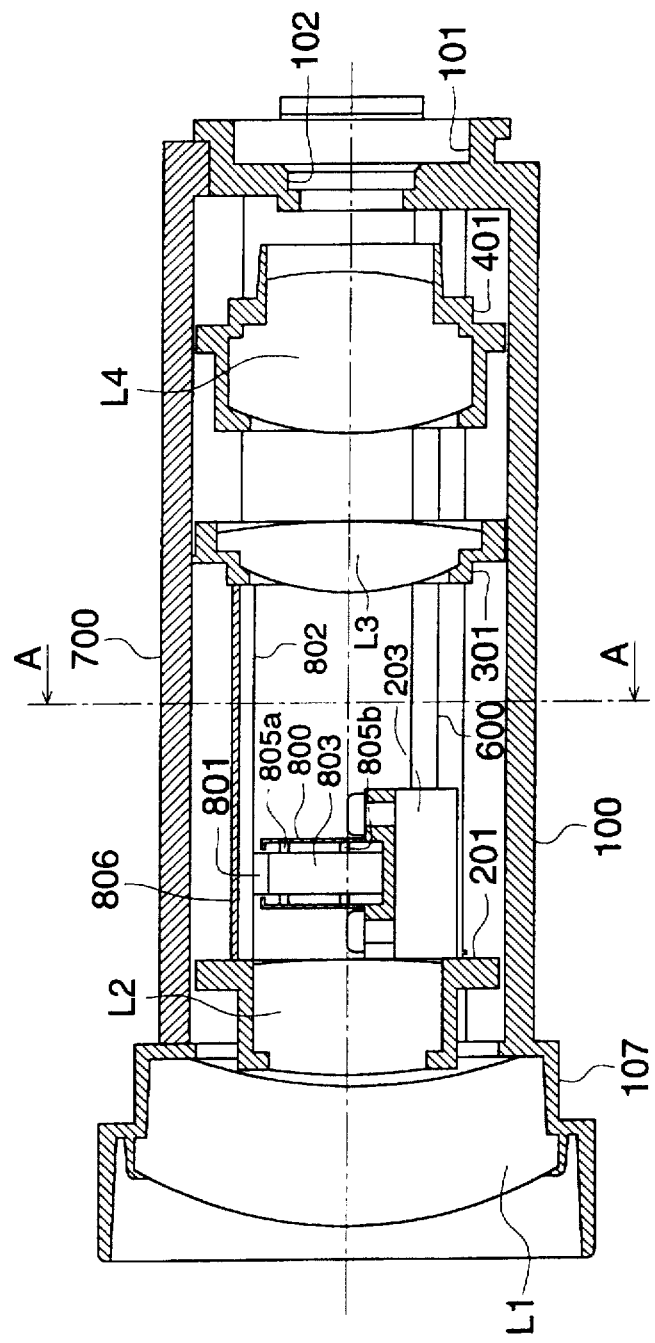
FIG. 7 is a vertical sectional view of another example of a lens device.
Figure 8:
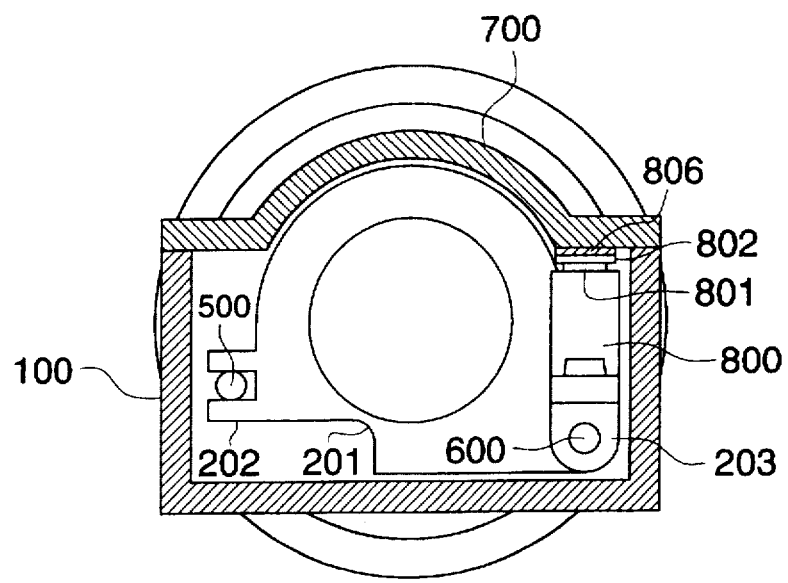
FIG. 8(A) is a sectional view, taken on line A—A of the lens device in FIG. 7.
FIG. 8(B) is a partial enlargement view of FIG. 8(A).
Figure 8:
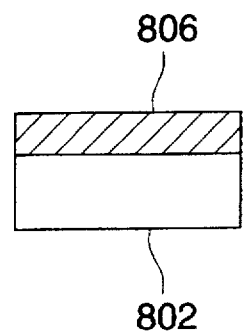
Figure 9:
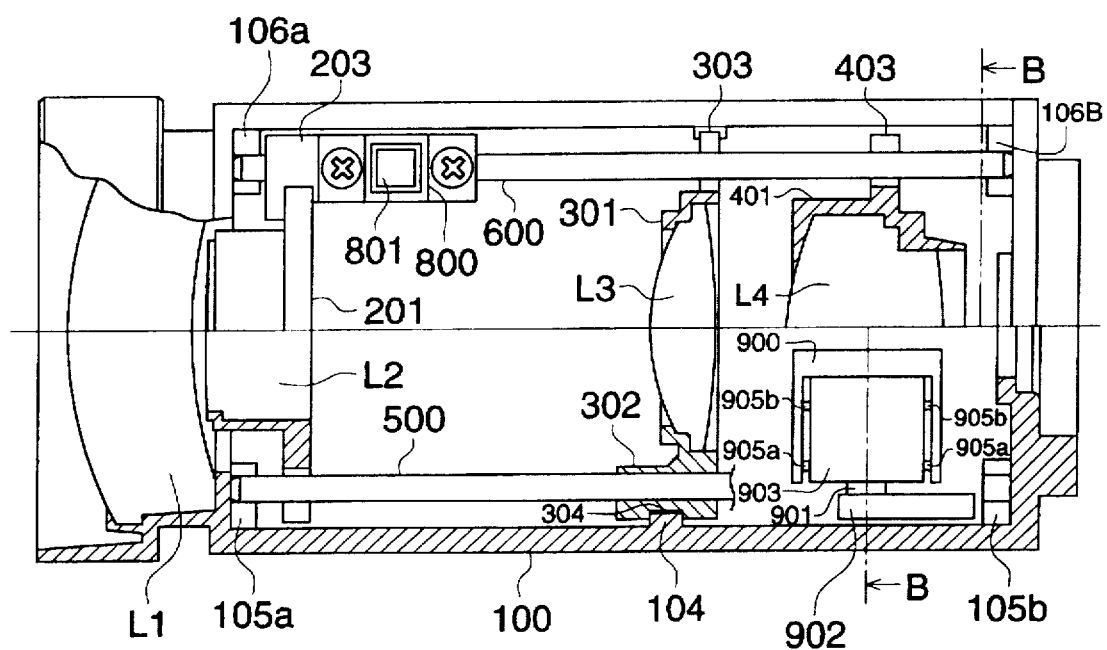
FIG. 9 is a plan view of the lens device in FIG. 7.
Figure 10:
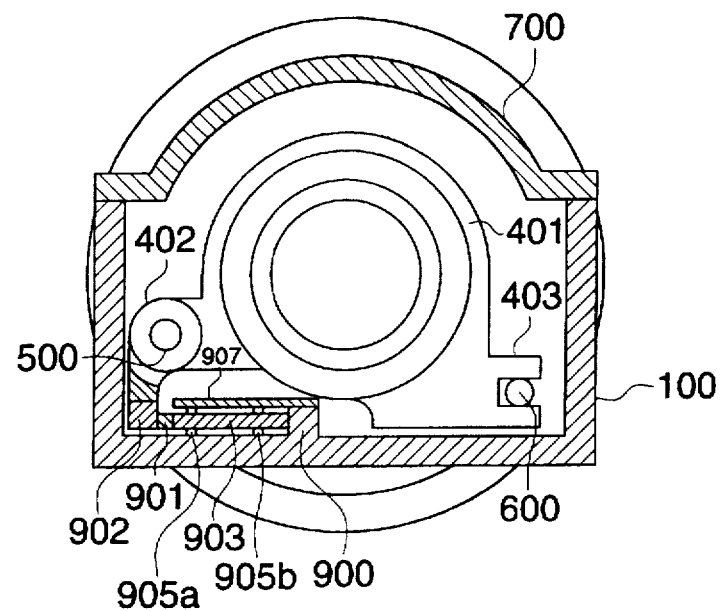
FIG. 10(A) is a sectional view, taken on line B—B of the lens device in FIG. 9.
FIG. 10(B) is a partial enlargement view of FIG. 10(A).
Figure 10:
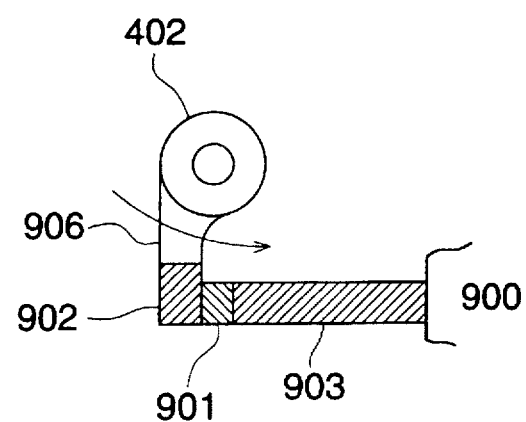
Figure 11:
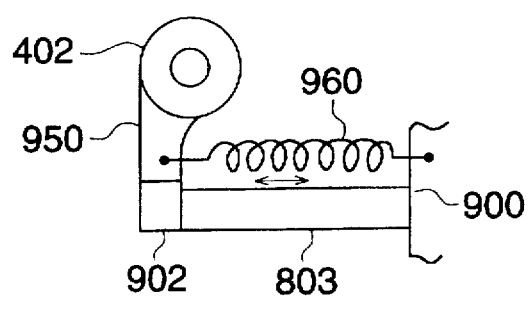
FIGS. 11(A) through 11(D) are views of another example with respect to a part shown in FIG. 10(B).
Figure 11:
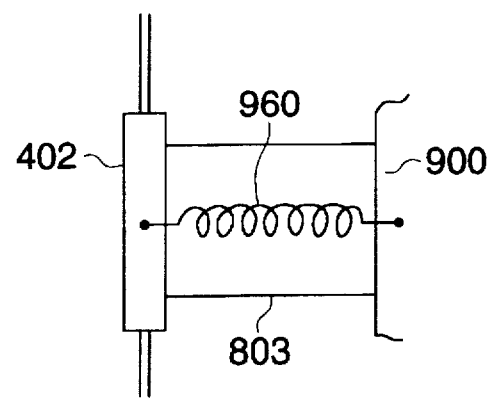
Figure 11:
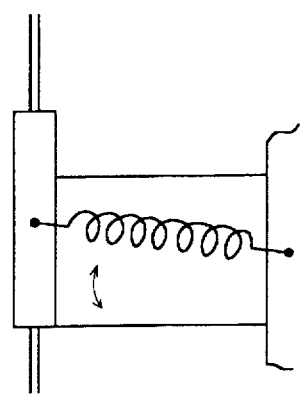
Figure 11:
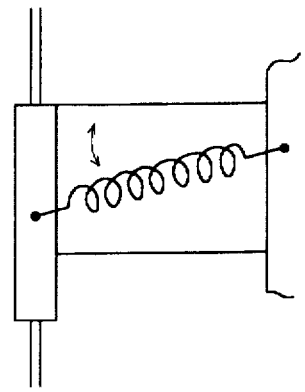

An example of a lens device of the present invention is shown in FIGS. 2 through 5 and another example of the lens device is shown in FIGS. 7 through 11(D). These views show a lens device for video cameras, where FIG. 2 is a vertical sectional view, FIG. 3 is a sectional view, taken on line A—A in FIG. 2, FIG. 4 is a plan view, and FIG. 5 is a sectional view, taken on line B—B in FIG. 4. Further, FIG. 7 is a vertical sectional view, FIG. 8(A) is a sectional view taken on line A—A in FIG. 7, FIG. 8(B) is a partial enlargement view of FIG. 8(A), FIG. 9 is a plan view of FIG. 7, FIG. 10(A) is a sectional view taken on line B—B in FIG. 9, and FIG. 10(B) is a partial enlargement view of FIG. 10(A).

An optical system is a zoom lens of a 4-group composition, similar to that of the conventional example. The zoom lens is composed of a fixed lens group L1, a movable lens group for magnification L2, a fixed lens group L3, and a movable lens group for focusing L4.

Initially, in FIG. 2, the fixed lens group L1 is held by a fixed lens group holding portion 107 which is integrally provided with a main barrel 100. A CCD mounting portion 101 and a low-pass filter frame 102 are provided on the opposite end of the fixed lens group holding portion 107 of the main barrel 100.

It can be seen from the sectional view in FIG. 3 that the main barrel 100 is concave, and a cover 700 is finally covered on an opening above the main barrel 100. FIG. 4 is a plan view, viewed from above the lens device while the cover 700 is removed from the lens device.

Guide pole supporting portions 105a and 105b to support a guide pole 500, are integrally provided with the main barrel 100 with a necessary interval between them in the direction of the optical axis. Similarly, guide pole supporting portion 106a and 106b to support a guide pole 600 are also integrally provided with the main barrel 100 with a necessary interval in the direction of the optical axis.

The guide poles 500 and 600 are respectively supported by the guide pole supporting portions 105a, 105b, and the guide pole supporting portions 106a, and 106b parallel to the optical axis. Thermal welding, adhesion, and other obvious technology disclosed in Japanese Patent Publication Open to Public Inspection No. 66059/1995, may be used as a fixing method of these 4 supporting portions and guide poles.

The moving frame 201 which holds the movable lens group for magnification L2 is integrally provided with a rotation stopper 202 and a guide bushing 203, as shown in FIG. 3. When they are respectively engaged with the guide pole 500 and the guide pole 600 as shown in the drawing, the movable lens group for magnification L2 is positioned on the optical axis, and is made to be slidable along the optical axis.

The fixed lens group L3 is held by the lens frame 301 as shown in FIG. 4, and when a guide bushing 302, integrally provided with the lens frame 301, is engaged with the guide pole 500, and the rotation stopper 303, integrally provided with the lens frame 301, is engaged with the guide pole 600, the fixed lens group L3 can be positioned on the optical axis. Further, when an engagement portion 304, provided on the guide bushing 302, is engaged with an engaging portion 104, provided on the main barrel 100, the fixed lens group L3 can be fixed at any predetermined position on the optical axis.

The moving frame 401 holding the movable lens group for focusing L4, is integrally provided with a guide bushing 402 and a rotation stopper 403 as shown in FIG. 5, and when they are respectively engaged with the guide pole 500 and the guide pole 600, the movable lens group for focusing L4 can be positioned on the optical axis, and can also slide along the optical axis.

Next, the piezoelectric vibrator which drives the movable lens group for magnification L2 and the movable lens group for focusing L4 will be described. FIGS. 6(A) through 6(F) are illustrations to explain the piezoelectric (ceramic) vibration, disclosed in publication U.S. Pat. No. 5,453,653 (corresponding to EU0633616A2), in which the ceramic is formed into a square pole configuration.

Referring to FIGS. 6(A) through 6(F), numeral 810 is a piezoelectric (ceramic) vibrator, in which electrodes 814, 816, 818 and 820 are respectively adhered on the longitudinal surface including its long side, as shown in FIG. 5(A) which is the central view, and the electrode 814 and the electrode 820, and the electrode 816 and the electrode 818, are respectively electrically connected by respective short circuiting wires 822 and 824. Further, an additional single electrode 830 is adhered on the entire surface, as shown in FIG. 6(F), of the rear face of the surface on which 4 electrodes are adhered, which is a grounding electrode.

As shown in the left lower drawing, FIG. 6(C), when an AC voltage of a specific frequency (which is close to both the resonance frequency of vibration in the direction of lateral deflection and that of frequency of vibration in the direction of longitudinal extension of the piezoelectric vibrator 810), is applied across the grounding electrode and the electrodes 816–818, while the electrodes 814–820 are electrically floated, then, a vibration mode as shown in the left drawing, FIG. 6(B), is generated.

That is, this piezoelectric vibrator 810 generates a complex vibration in which the vibration in the direction of lateral deflection and that in the direction of longitudinal extension are superimposed, and in the case of FIG. 6(B), the vibration is generated in which X shows the maximum minus amplitude when Y shows the maximum plus amplitude, (the sign of respective amplitude in the direction of X is reverse to that in the direction of Y). Then, on the upper end 828 of the piezoelectric vibrator, a locus of counterclockwise oval movement is shown, as shown in the upper portion of FIG. 6(A).

Further, as shown in FIG. 6(E), when an AC voltage of the same frequency as described above, is applied across the grounding electrode and the electrodes 814–820, an vibration mode as shown in FIG. 6(D) is generated, and vibration is generated in which X also shows the maximum plus amplitude when Y shows the maximum plus amplitude, (the sign of respective amplitude in the direction of X is equal to that in the direction of Y). Then, on the upper end 828 of the piezoelectric vibrator 810, a locus of clockwise oval movement is shown, which is reverse to the above-described direction, shown in the upper portion of FIG. 6(A).

Therefore, a contact portion 826 is attached onto the upper end 828 of the piezoelectric vibrator 810, and when the piezoelectric vibrator 810 is pushed to any movable body by a spring 844 from the lower end 843, opposite of the upper end 828, the movable body is moved while being dragged by the oval movement of the contact portion 826.

The contact portion 826 is attached onto the upper end 828, except that the piezoelectric vibrator 810 itself is pushed to the movable body, for the following reason. The contact portion 826 is used to prevent the piezoelectric vibrator 810 from being worn out during operations because the force required by the spring 844 is considerably high, and wear resistant material is used for the contact portion 826.

In order to support the piezoelectric vibrator 810, it is best to support 2 portions (832, 834, and 836, 838 in the drawing), which correspond to nodes of vibration in the direction of lateral deflection.

The essentials of the lens device of the present invention exist in that the vibration of the piezoelectric vibrator is utilized for lens driving.

In FIGS. 2 and 3, a piezoelectric vibrator 803, which is supported by supporting portions 805a and 805b, and which has the contact portion 801 on its leading edge, is pushed by the spring 806 against the sliding surface 802, attached inside the cover 700 of the main barrel 100, inside the vibrator supporting frame 800 which is attached to the guide bushing portion 203 of the moving frame 201.

This piezoelectric vibrator 803 is provided with the identical electrodes as in FIGS. 6(A) through 6(F), and when an AC voltage of a specific frequency, as described above, is applied to the electrodes through lead wires, not shown in the drawing, the contact portion 801 provided on the leading edge of the piezoelectric vibrator, moves elliptically, and applies a force on the sliding surface 802, due to the piezoelectric vibration by the above-described principle. When the piezoelectric vibrator 803 is supported so that the direction of the applied force is parallel with the optical axis, the vibrator supporting frame 800, which supports the piezoelectric vibrator 803, that is, the moving frame 201 is moved along the optical axis by the reaction force to the applied force.

On the other hand, as shown in FIGS. 4 and 5, a sliding surface 902 is provided on the guide bushing 402 of the moving frame 401, a piezoelectric vibrator 903 is held in the vibrator supporting frame 900 provided in the main barrel 100, by supporting portions 905a, 905b and a pressing plate 907, and is pressed on the sliding surface 902 by a spring 906.

This piezoelectric vibrator 903 is provided with the identical electrodes as in FIGS. 6(A) through 6(F), and when an AC voltage of a specific frequency as described above, is applied to the electrodes through the lead wires, not shown in the drawing, the contact portion 901 provided on the leading edge of the piezoelectric vibrator, moves elliptically, and applies a force onto the sliding surface 902, due to the piezoelectric vibration by the above-described principle.

When the piezoelectric vibrator 903 is supported so that the direction of the applied force is parallel to the optical axis, the moving frame 401, on which the sliding surface 902 is provided, is moved along the optical axis by the force.

Unlike the piezoelectric vibrator 803, this piezoelectric vibrator 903 is not formed into a square pole, but is plate-like, however, its principle is quite the same. Because the attached portion is a flat surface portion on the bottom of the main barrel, the shape is plate-like so as to effectively use the space.

That is, the complex vibration mode of the vibration in the direction of lateral deflection and the vibration in the direction of longitudinal extension, changes depending also on the shape of piezoelectric vibrator, other than the frequency and the value of the applied AC voltage. Reversely, once the shape is determined, the same vibration mode is generated stably depending on the same frequency and the same applied voltage, and therefore, the shape can be quite freely selected, to some extent, depending on the available space.

Another example, in which the movable lens group for magnification change L2 is made to be slidable along the optical axis, is shown in FIGS. 7, 8(A) and 8(B).

The structure and function, different from those in FIGS. 2 and 3, will be mainly described below.

In FIGS. 7, 8(A) and 8(B), the spring 806, which is a pressing means, is made of, for example, a rubber sheet, or the like, and one surface of the spring 806 is fixed to the cover 700, while the other surface is attached to the sliding surface 802. By this spring 806, the sliding surface 802 is pushed against the piezoelectric vibrator 803, which is attached to the vibrator supporting frame 800, through the contact portion 801.

When an AC voltage of a specific frequency, as described above, is applied to the piezoelectric vibrator 803, the contact portion 801 provided on the leading edge of the piezoelectric vibrator moves elliptically, and applies a force on the sliding surface 802, due to the piezoelectric vibration by the above-described principle. The vibrator supporting frame 800, which supports the piezoelectric vibrator 803, that is, the moving frame 201, is moved along the optical axis by the reaction force to the applied force in the same manner as in FIGS. 2 and 3.

Next, still another example, in which the movable lens group for focusing L4 is made to be slidable along the optical axis, is shown in FIGS. 9, 10(A) and 10(B).

The structure and function, different from those in FIGS. 4 and 5, will be mainly described below.

In FIGS. 9, 10(A) and 10(B), one end of the pressing means 906, having spring characteristics, is attached to the guide bushing 402 of the moving frame 401, and the other end of the pressing means is fixed to the sliding surface 902. On the other hand, the piezoelectric vibrator 903 is held by supporting portions 905a, 905b, and the vibrator supporting frame 900 provided in the main barrel 100. By this spring force, shown by an arrow in FIG. 10(B), of the pressing means 906, the sliding surface 902 is pressed against the piezoelectric vibrator 903.

When an AC voltage of a specific frequency as described above, is applied to the piezoelectric vibrator 903, the contact portion 901 provided on the leading edge of the piezoelectric vibrator 903, moves elliptically, and applies a force onto the sliding surface 902, due to the piezoelectric vibration by the above-described principle. By this force, the guide bushing 402, that is, the moving frame 401, on which the sliding surface 902 is provided, is moved along the optical axis.

Yet another example, in which the spring force of the pressing means 906 for pressing the sliding surface 902 against the piezoelectric vibrator 903 is utilized, is shown in FIGS. 11(A) through 11(D).

As shown in FIG. 11(A), a tension spring 960 is provided between an inelastic arm portion 950 provided on the guide bushing 402, and the vibrator supporting frame 900, so that they are pulled toward each other. By this structure, the moving frame 401 is moved along the optical axis. By recent experiments, it has been found that this structure is most efficient.

The function of this structure is as follows. As shown in FIGS. 11(B), 11(C) and 11(D), when the guide bushing 402 to be driven, is moved, the tension spring 960 is shifted by a certain angle, as shown in the drawings. When this angle is small (when the movement amount of the driven body is small), the change of the pressing force by the spring is small. Alternatively, when the spring is designed to obtain a small spring constant in order to reduce the change of the pressing force, a larger effect can be attained.

When the piezoelectric vibrator is held by the movable object, (the lens frame in the present example), the lens frame can be moved by a smaller piezoelectric vibrator, and the overall size of the lens device can be reduced, which is advantageous.

Further, in the lens device, sometimes, a plurality of lens frames are moved for zooming or focusing. In this case, when the piezoelectric vibrator is provided for each lens frame, movement of a plurality of lens frames can be independently controlled, which is more preferable.

Incidentally, when piezoelectric vibrators of the same shape are used, the moving speed of the moving frame by this actuator is absolutely determined. Accordingly, the moving distance with respect to the voltage application time can be previously investigated.

Further, in this actuator, the piezoelectric vibrator is pressed on the sliding surfaces 802 and 902 by springs 806 and 906, and therefore, when the voltage is not applied on the piezoelectric vibrator, the moving frame also has a holding force to maintain its position.

That is, by using these two features, so-called step driving can be realized, in which a driving operation to move the lens a certain distance for a certain short time, is successively carried out.

Further, as described above, because the distance to be moved for the short time, is previously known, if a specifically precise position accuracy is not required, an open loop control can be realized by only setting an initial position at the start time of a camera by an initial position setting device using, for example, a photo-interrupter, without adopting the closed loop control using a separately prepared position encoder.

Of course, because there is some amount of dispersion, when precise positioning is required, a widely known position encoder such as an optical type, a magnetic variance type, or a thin film resistance type encoder, may be utilized.

Figure 12:
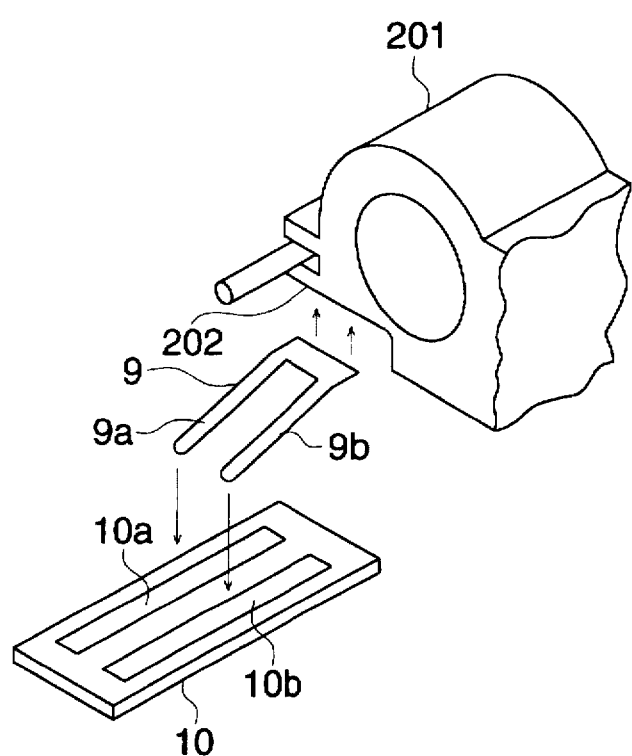
FIG. 12 is a perspective view of a thin-film resistance type position encoder.
Figure 13:
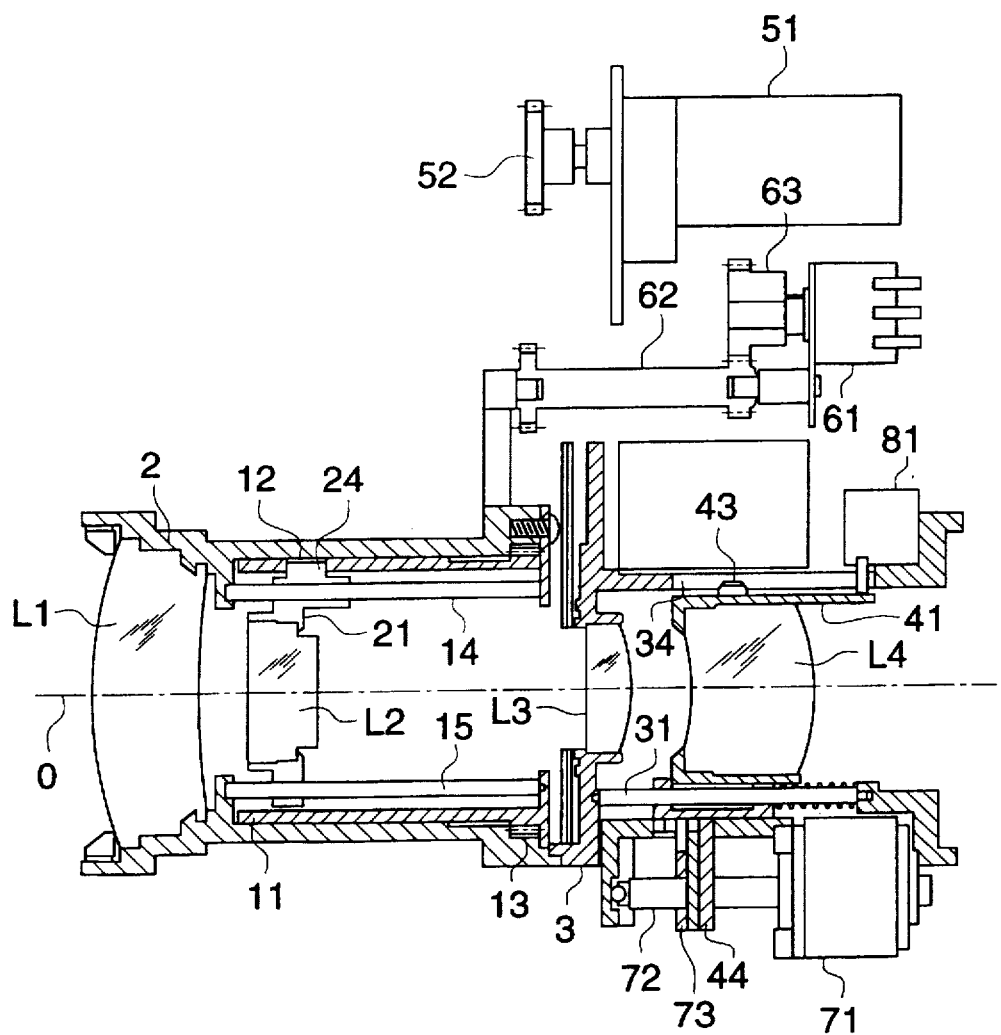
FIG. 13 is a view of a conventional lens device.

In the present example, only the movable lens group for magnification L2 requires accurate position information, the thin film resistance type position encoder is arranged between the bottom portion of the main barrel 100, shown in FIG. 3, and the rotation stopper 202 of the moving frame 201 as shown in FIG. 12, so that accurate position information can be obtained.

In FIG. 12, numeral 9 is a contact piece, and one arm portion 9a comes into contact with a thin film 10a of a base plate 10, and the other arm portion 9b comes into contact with a thin film 10b, and both arms slide on the film.

In this connection, there are many types of position encoders as described above, and this thin film resistance type encoder is the most inexpensive.

However, the thin film resistance type position encoder is a contact type one, and therefore, generally in many cases, a friction force generated on its contact surface becomes a problem.

However, in the lens device of the present invention, the piezoelectric vibrator of the actuator is pressed on the sliding surfaces as described above, and a large frictional force is generated between them. Therefore, the frictional force of the thin film resistance type position encoder is much smaller as compared to the generated frictional force described above, and even if the frictional force of the encoder is added to the generated frictional force, it exerts almost no additional influence on the lens device.

As described above, in the thus structured lens device of the present invention, unlike the conventional example, an actuator which is a lens driving device, can be mounted on the moving frame itself, and is not limited to having the actuator to be attached to the moving frame with a configuration as in the present example, but the actuator may be quite freely attached to the moving frame with a configuration facing the side or the bottom.

Further, in cases where the actuator is attached to the main barrel, which is an outer frame of the lens device, the actuator main body may be formed into a plate-shape so as to optimally utilize the space, or its shape may be quite freely selected to some extent depending on the space, unlike conventional motors.

Further, because the entire actuator body is housed inside the main barrel, there is no protrusion outside the outer frame of the lens device, so that the space is greatly saved.

These facts mean that the actuator can meet any shape of lens devices required by various types of cameras, which is epoch-making as compared to the conventional examples in which the shape of the lens device is determined by the lens driving actuator.

Further, when an position encoder is required, an inexpensive thin film resistance type encoder can be utilized, which is a large advantage of the present lens device.

Furthermore, while the actuator is composed of many parts such as a magnet, a coil and the like, in the conventional lens device, the actuator in the lens device of the present invention is made of vibrator material itself, and the number of parts of the entire device is very few, resulting in a great reduction in cost.

Still further, the AC voltage to be applied on this piezoelectric vibrator has a frequency of more than 40 kHz which is generally far higher than the perceptible human audio frequency, so that no noise is audible to anyone, which is quite different in the case of the conventional examples, which is another epoch-making feature.

Yet further, while conventional lens devices using an electromagnetic force actuator is a low impedance device employing a low voltage and large current, the present lens device incorporating the actuator, employing the piezoelectric vibration of the present invention, is a high impedance device. Accordingly, although the applied voltage is high, the current only slightly flows, and consequently, the power consumption is much smaller than for conventional ones.

That is, the lens device of the present invention is regarded to be a device which can entirely solve the conventional problems.

Incidentally, a linear guide, by which the moving lens frame is guided along the optical axis, is not limited to a method using two guide poles, a guide bushing provided on the moving frame and the rotation stopper as in the configuration of the present example, but various types of linear guiding methods may also be used.

According to the lens device of the present invention, the following effects can be attained: an actuator is incorporated in the moving frame itself; the shape of the lens device can be determined so as to effectively utilize the outer frame of the lens device; a great cost reduction is possible because of the few number of parts: the power consumption is low; and no noise is heard because the frequency of the applied voltage is much higher than the audio frequency. Furthermore, even if the number of types of moving lenses is more than 3, they can be easily driven, and thereby, the degree of freedom for optical selection is greatly increased. Further, the actuator is made of vibrator material itself, and therefore, the number of parts of the entire actuator is very small. Still further, even when a position encoder is required for a closed loop control, an inexpensive contact type encoder having some frictional force can also be used, and thereby, collectively, a great cost reduction can be realized.

What is claimed is:

1. A lens moving device comprising:
    (a) a lens frame;
    (b) guiding means for guiding the lens frame;
    (c) signal generating means for generating an electric signal;
    (d) a piezoelectric vibrator for moving the lens frame along the guiding means by vibration in response to the electric signal;
    (e) supporting means for supporting the piezoelectric vibrator;
    (f) a pressure surface for making pressure contact with the piezoelectric vibrator; and
    (g) pressure means for bringing the piezoelectric vibrator into pressure contact with the pressure surface;
    wherein the supporting means and the pressure means are disposed on the lens frame, and the pressure surface is disposed on a stationary surface of the device.

2. A lens moving device comprising:
    (a) a lens frame;
    (b) guiding means for guiding the lens frame;
    (c) signal generating means for generating an electric signal;
    (d) a piezoelectric vibrator for moving the lens frame along the guiding means by vibration in response to the electric signal;
    (e) supporting means for supporting the piezoelectric vibrator;
    (f) a pressure surface for making pressure contact with the piezoelectric vibrator; and
    (g) pressure means for bringing the piezoelectric vibrator into pressure contact with the pressure surface;
    wherein the supporting means and the pressure means are disposed on a stationary surface of the device, and the pressure surface is disposed on the lens frame.

3. A lens moving device comprising:
    (a) a lens frame;
    (b) guiding means for guiding the lens frame;
    (c) signal generating means for generating an electric signal;
    (d) a piezoelectric vibrator for moving the lens frame along the guiding means by vibration in response to the electric signal;
    (e) supporting means for supporting the piezoelectric vibrator;
    (f) a pressure surface for making pressure contact with the piezoelectric vibrator; and
    (g) pressure means for bringing the piezoelectric vibrator into pressure contact with the pressure surface;
    wherein the supporting means is disposed on a stationary surface of the device, the pressure surface and the pressure means are disposed on the lens frame.

* * * * *